United States Patent

Inagaki et al.

[11] Patent Number: 5,859,400
[45] Date of Patent: Jan. 12, 1999

[54] TERMINAL FRAME USED TO MANUFACTURE ELECTRONIC DEVICES AND MANUFACTURING SYSTEM OF TERMINAL FRAMES

[75] Inventors: Yasushi Inagaki; Daisaku Kugou; Kunikazu Nakahara, all of Toyama, Japan

[73] Assignee: Murata Manufacturing, Co., Ltd., Japan

[21] Appl. No.: 739,280

[22] Filed: Oct. 29, 1996

Related U.S. Application Data

[63] Continuation of Ser. No. 425,460, Apr. 20, 1995, abandoned.

[30] Foreign Application Priority Data

Apr. 27, 1994 [JP] Japan ................................. 6-089730

[51] Int. Cl.$^6$ ........................... B23K 11/00; B23K 101/38
[52] U.S. Cl. .................... 219/56.1; 219/56.22; 219/119; 361/813; 437/206; 439/72
[58] Field of Search ................ 219/56.1, 56.21, 219/56.22, 119; 361/813; 257/666, 692, 693; 174/52.4; 437/206; 439/68, 70, 72

[56] References Cited

U.S. PATENT DOCUMENTS

| | | |
|---|---|---|
| 3,500,013 | 3/1970 | Suel et al. .................... 219/56.21 |
| 3,751,624 | 8/1973 | Banks et al. .................. 219/56.1 |
| 3,912,900 | 10/1975 | Arnett ........................... 219/119 |
| 4,465,913 | 8/1984 | Stokoe et al. ................ 219/86.25 |
| 5,370,300 | 12/1994 | Okumura ..................... 219/56.22 |

FOREIGN PATENT DOCUMENTS

| | | | |
|---|---|---|---|
| 277864 | 4/1990 | Germany ................. 219/56.1 |
| 57-121886 | 7/1982 | Japan . | |
| 63-16632 | 1/1988 | Japan . | |
| 3-74808 | 3/1991 | Japan .................... 219/56.22 |
| 5-326341 | 12/1993 | Japan . | |

*Primary Examiner*—Teresa J. Walberg
*Assistant Examiner*—J. Pelham
*Attorney, Agent, or Firm*—Ostrolenk, Faber, Gerb & Soffen, LLP

[57] ABSTRACT

A terminal frame used to manufacture electronic devices, the terminal frame having a metal strip and a plurality of stick-like metal terminals. The metal terminals are joined to the metal strip by resistance welding. A manufacturing system of such terminal frames includes a device used for resistance welding, where the device has an electrode which holds each terminal at a portion near a joint portion, and a current is supplied to the terminal through the electrode.

29 Claims, 4 Drawing Sheets

TERMINAL FRAME USED TO MANUFACTURE ELECTRONIC DEVICES AND MANUFACTURING SYSTEM OF TERMINAL FRAMES

This is a continuation of application Ser. No. 08/425,460, filed on Apr. 20, 1995, now abandoned.

BACKGROUND OF THE INVENTION

1. Field of the Invention

The present invention relates to a terminal frame which is used to manufacture electronic devices with lead terminals and a manufacturing system for such terminal frames.

2. Description of Related Art

There is a type of electronic device, such as a piezoelectric resonator, which has lead terminals. This type of electronic device is mounted on a printed circuit board by inserting the lead terminals into through holes of the printed circuit board by an automatic component mounting machine and soldering the lead terminals to lands of the printed circuit board. In manufacturing electronic devices of this type, a terminal frame having a strip which supports metal terminals protruding in parallel from one side is used. The terminals are attached to electronic devices as lead terminals. FIGS. 8 and 9 show prior art terminal frames. FIG. 8 shows a punched terminal frame, and FIG. 9 shows a taped terminal frame.

The punched terminal frame of FIG. 8 comprises a frame 11 which is a strip with a specified width and a plurality of metal terminals 12 which protrude from a side of the frame 11 at specified intervals. The terminal frame is made by punching the frame 11 and the terminals 12 integrally out of sheet metal. The terminal frame of FIG. 9 comprises a frame 14 which is a strip of cardboard or sheet metal and stick-like, such as cylindrical, metal terminals 15. The metal terminals 15 are arranged in line on a surface of the frame 14 and are fixed on the frame 14 by an adhesive tape 16 or the like.

In producing the terminal frame of FIG. 8, after punching the frame 11 and the terminals 12 out of the sheet metal, the rest of the sheet metal is wasted, which is disadvantageous as to cost. An electronic device which is produced using this terminal frame has thin lead terminals. A failure is likely to occur in inserting the lead terminals into through holes of a printed circuit board and in cutting or bending the end portions of the lead terminals which pierce the printed circuit board to the reverse side. A possible measure to avoid these problems is to roll the terminals 12 into cylinders after the punching. However, this measure requires an additional process and increases the cost.

The taped terminal frame of FIG. 9 requires more processes and more parts. Further, the taped terminal frame is not mechanically strong against tension and torsion and is unstable. The metal terminals 15 must be made longer than necessary by an amount about the width of the adhesive tape 16, which is disadvantageous as to cost. In order to comply with a case wherein the terminal frame is heated in manufacturing electronic devices, the frame 14 and the adhesive tape 16 must resist heat, which also increases the cost manufacture.

SUMMARY OF THE INVENTION

An object of the present invention is to provide a terminal frame which can be produced at lower cost and using simple processes. Further, the present invention should have good mechanical strength and should not result in electronic devices which may have problems when they are mounted on printed circuit boards by an automatic component mounting machine.

Another object of the present invention is to provide a manufacturing system which is capable of producing a terminal frame which has the above advantages.

A terminal frame according to the present invention comprises a metal strip and a plurality of stick-like metal terminals, where the metal terminals are joined to the metal strip by resistance welding.

A terminal frame manufacturing system according to the present invention is provided with a device for joining a plurality of stick-like metal terminals to a metal strip by resistance welding, and the system has an electrode for holding a portion of each terminal near a joint portion to be joined to the metal terminal.

The terminal frame according to the present invention is produced by joining a plurality of metal terminals to a metal strip by resistance welding, such that little waste is generated during the production. For assembly of the terminal frame, only a small number of parts and a small number of processes are necessary. Further, the assembled terminal frame is mechanically strong.

In the manufacturing system according to the present invention, the electrode comes into face-contact with each terminal, where the contact area between the electrode and the terminal is large. Therefore, the resistance welding can be carried out easily and with precision.

BRIEF DESCRIPTION OF THE DRAWINGS

These and other objects and features of the present invention will be apparent from the following description with reference to the accompanying drawings, in which.

DETAILED DESCRIPTION OF THE PREFERRED EMBODIMENTS

Preferred embodiments of the present invention are described with reference to the accompanying drawings.

Figure 3:
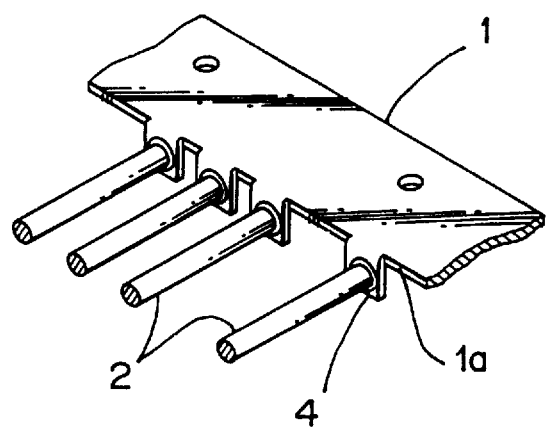
FIG. 3 is a perspective view of a terminal frame which is a third embodiment of the present invention.
Figure 4:
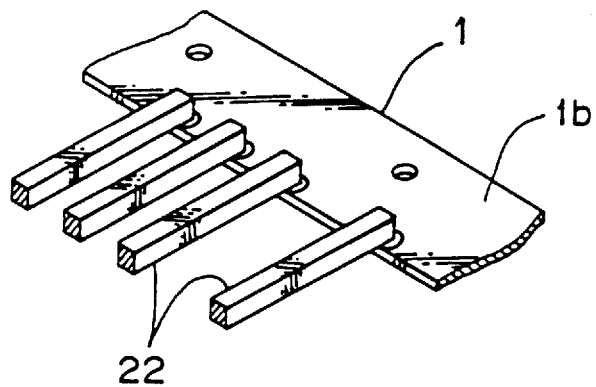
FIG. 4 is a perspective view of a terminal frame which is a fourth embodiment of the present invention.
Figure 5:
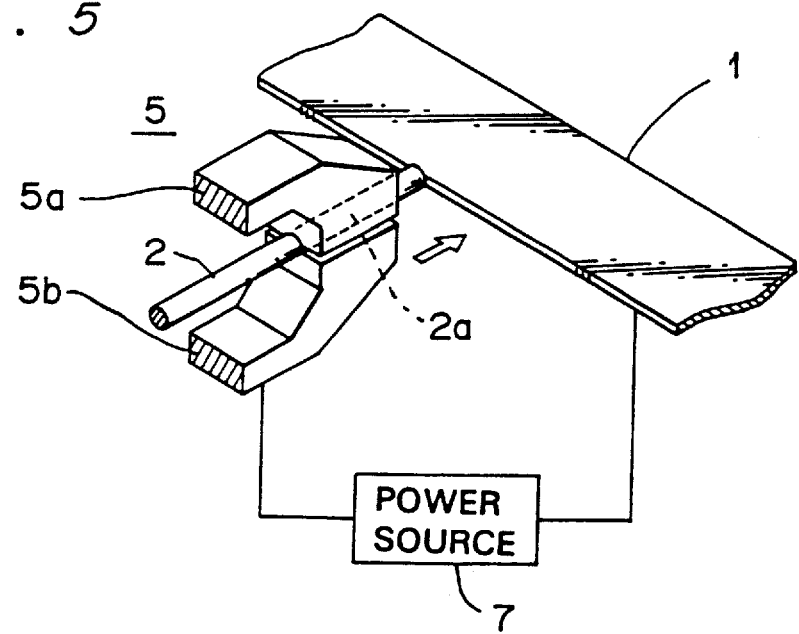
FIG. 5 is a perspective view of an electrode which is provided in a manufacturing system according to the present invention.
Figure 7:
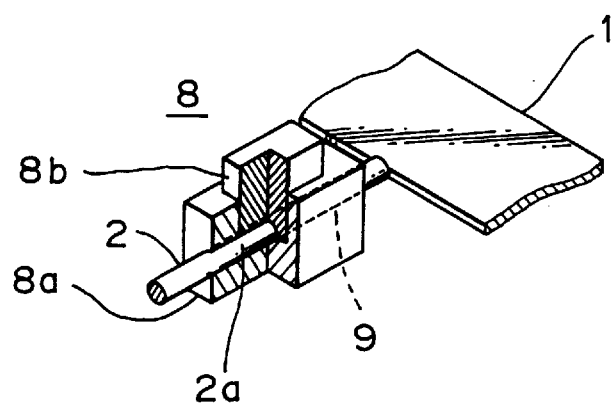
FIG. 7 is a perspective view of a modified electrode.
Figure 8:
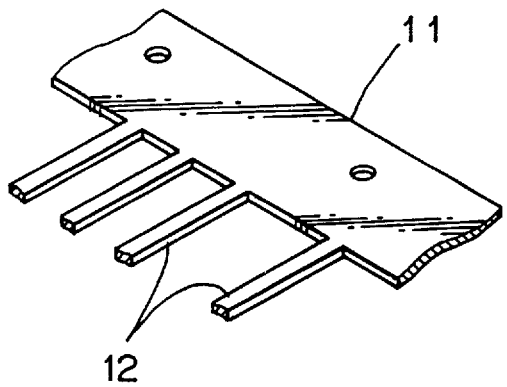
FIG. 8 is a perspective view of a punched terminal frame of prior art.

FIGS. 1, 2, 3 and 4 show a first embodiment, a second embodiment, a third embodiment and a fourth embodiment of the present invention, respectively. FIG. 5 shows an electrode of a terminal frame manufacturing system according to the present invention. FIG. 7 shows a modification of the electrode.

Figure 1:
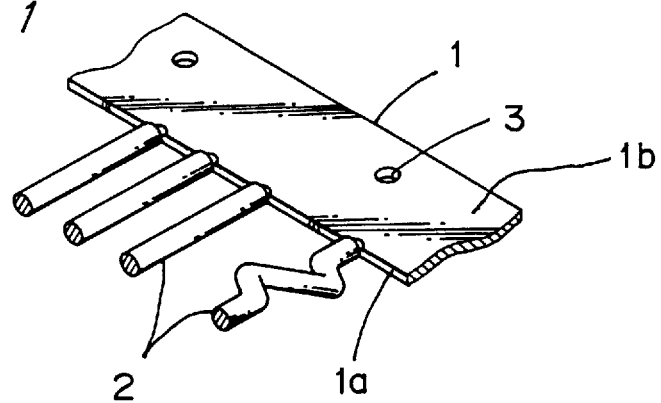
FIG. 1 is a perspective view of a terminal frame which is a first embodiment of the present invention.

A terminal frame according to the present invention is used to manufacture electronic devices, such as piezoelectric resonators, which have lead terminals. The first embodiment, as shown in FIG. 1, comprises a frame 1 having a strip of metal and a plurality of metal terminals 2 which protrude in parallel from a side 1a of the frame 1. In manufacturing electronic devices, the metal terminals 2 are attached to the electronic devices as lead terminals. The frame 1 is a strip of sheet metal, and the terminals 2 are cylinders whose diameters are a little larger than the thickness of the frame 1. The terminals 2 are joined to the frame 1 by resistance welding. More specifically, one end of each of the terminals 2 is pressed against the side 1a of the frame 1 and resistance-welded thereto. Holes 3 in FIG. 1 are to move the frame 1, and the holes 3 are made in the frame 1 at uniform intervals in the lengthwise direction.

The terminals 2 are made by cutting a cylindrical metal rod into pieces with a specified length. Although the cylindrical metal rod is ordinarily plated with solder or the like, when the rod is cut, the sections are not plated. Accordingly, there is no fear that the plating may cause problems with resistance-welding the terminals 2 to the frame 1. The terminals 2 are not necessarily cylindrical, and they may be prismatic. Further, it is possible to bend the terminals 2 in order to provide elasticity.

Figure 2:
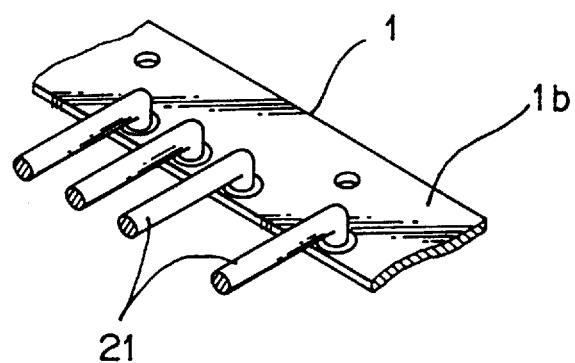
FIG. 2 is a perspective view of a terminal frame which is a second embodiment of the present invention.

In the first embodiment shown in FIG. 1, the terminals 2 are resistance-welded to the side 1a of the frame 1. However, the terminals 2 may be resistance-welded to the frame 1 in other ways as shown in FIGS. 2 through 4. A terminal frame of FIG. 2 has terminals 21 which are resistance-welded to a major surface 1b of the frame 1 and bent in a direction parallel to the major surface 1b. A terminal frame of FIG. 3 has tabs 4 which are extended from the side 1a of the frame 1 in a direction perpendicular to the major surface 1b of the frame 1, and the terminals 2 are resistance-welded to the tabs 4. The embodiments of FIGS. 2 and 3 have an advantage in that the ends of the terminals are entirely pressed against the frame 1, thereby improving the efficiency of the resistance welding.

Figure 9:
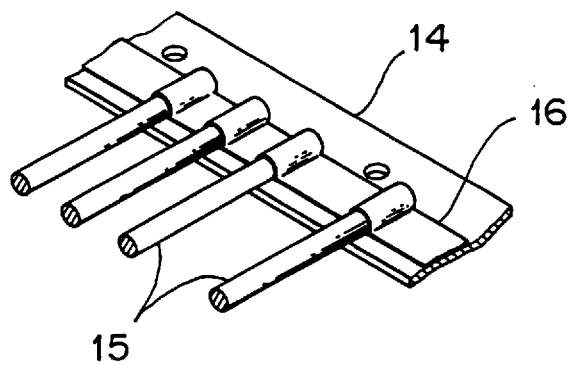
FIG. 9 is a perspective view of a taped terminal frame of prior art.

A terminal frame of FIG. 4 has square prismatic terminals 22 which are resistance-welded to the major surface 1b of the frame 1. The portions of the terminals 22 which are pressed against the major surface 1b of the frame 1 are shorter than the portions of the terminals 15 which are taped on the frame 14 of the conventional terminal frame of FIG. 9. Although in the forth embodiment shown in FIG. 4, the terminals 22 are made as square prisms in order to provide stability, the terminals 22 may be cylindrical.

Next, referring to FIG. 5, a device which is provided in a terminal frame manufacturing system according to the present invention is described.

Figure 6:
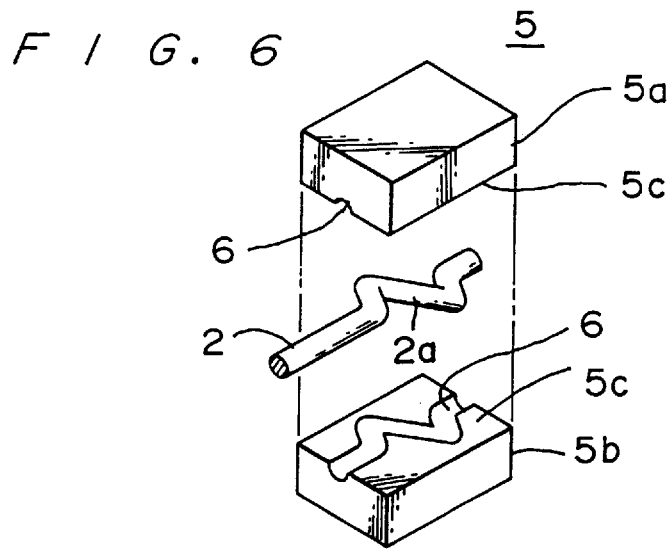
FIG. 6 is a perspective view of a nipping surface of a segment of the electrode.

The device is used to resistance-weld the terminals 2, 21 or 22 to the frame 1. The device has an electrode 5 which holds a portion 2a of each terminal 2 near the end pressed against the frame 1. The electrode 5 has an upper segment 5a and a lower segment 5b. The electrode 5 nips (or holds) the portion 2a of each terminal 2 and presses the terminal 2 against the frame 1. As shown in FIG. 6, grooves 6 which make a space for the portion 2a are disposed on nipping surfaces 5c of the upper and lower segments 5a and 5b. FIG. 6 shows an electrode 5 to hold a bent terminal 2, and the grooves 6 correspond to the bent portion of the terminal 2. However, if the terminal 2 is straight, then the grooves 6 are made straight.

A welding power source 7 is serially connected between the electrode 5 and the frame 1, and a current flows from the power source 7 to the electrode 5 and the frame 1. In FIG. 5, the power source 7 is connected to the frame 1 directly.

However, it is also possible to provide a support (not shown) for the frame 1 and to connect the power source 7 to the support.

The device may have an electrode 8 shown in FIG. 7 instead of the electrode 5 of FIG. 5. The electrode 8 has a main segment 8a with a through hole 9 for the portion 2a and an auxiliary segment 8b. The terminal 2 is inserted in the through hole 9 of the main segment 8a, and the auxiliary segment 8b is pressed into the main segment 8a to support the terminal 2.

In producing a terminal frame in the manufacturing system provided with the electrode 5, the electrode 5 nips the portion 2a of the terminal 2 and presses the terminal 2 against the side 1a or the major surface 1b of the frame 1 while supplying a current to the terminal 2. Thereby, resistance heat is generated between the frame 1 which is supplied with a current by the power source 7 and the terminal 2, and in this way, the terminal 2 is joined to the frame 1 by resistance welding.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A terminal frame for electronic devices, the terminal frame comprising:
   a metal strip having at least one substantially planar portion, the planar portion having first and second spaced apart major surfaces and at least one side surface connecting the first and second major surfaces at respective edges; and
   a plurality of elongated metal terminals, each having first and second opposing ends, the first end of each terminal being resistance welded to the side surface of the planar portion of the metal strip.

2. A terminal frame as claimed in claim 1, wherein the metal terminals are cylindrical.

3. A terminal frame as claimed in claim 1, wherein the metal terminals are prismatic.

4. A terminal frame manufacturing system provided with a device for joining a plurality of elongated metal terminals to a metal strip by resistance welding,
   the metal strip having at least one substantially planar portion, the planar portion having first and second spaced apart major surfaces and at least one side surface connecting the first and second major surfaces at respective edges,
   each elongated metal terminal having first and second opposing ends, the first end of each terminal to be resistance welded to the side surface of the planar portion of the metal strip,
   the manufacturing system comprising:
      an electrode for supplying a current to each of the metal terminals, the electrode holding a portion of the terminal near the first end thereof to be resistance-welded to the metal strip; and
      a power source connected in series with the electrode and the metal strip.

5. A terminal frame manufacturing system as claimed in claim 4, wherein:
   the electrode has two segments including respective nipping surfaces which nip each of the terminals therebetween, the nipping surfaces of the segments including grooves forming a space for receiving the portion of the terminal to be held thereby.

6. A terminal frame manufacturing system as claimed in claim 4, wherein:
the electrode has a main segment including a through hole for receiving the portion of the terminal to be held thereby, an opening permitting communication with the terminal, and an auxiliary segment at least partially receivable in the opening to support the terminal inserted in the through hole.

7. A terminal frame as claimed in claim 1, wherein at least one of said metal terminals is bent in a manner to provide elasticity to the terminal.

8. A terminal frame as claimed in claim 7, wherein said at least one terminal is bent in a zig zag shape.

9. The terminal frame of claim 1, wherein the first and second major surfaces are substantially parallel.

10. The terminal frame of claim 1, wherein at least one of the terminals includes a re-entrant bend for providing elasticity.

11. A terminal frame for electronic devices, the terminal frame comprising:
a metal strip having at least one substantially planar portion, the planar portion having first and second spaced apart surfaces and at least one side surface connecting the first and second surfaces at respective edges, the first, second and side surfaces each having respective first, second and side surface areas, the side surface area being smaller than either of the first and second surface areas; and
a plurality of elongated metal terminals, each having first and second opposing ends, the first end being resistance welded to the side surface of the planar portion of the metal strip.

12. The terminal frame of claim 11, wherein at least one of the terminals is cylindrical.

13. The terminal frame of claim 11, wherein at least one of the terminals is prismatic.

14. The terminal frame of claim 11, wherein the first and second major surfaces are substantially parallel.

15. The terminal frame of claim 11, wherein at least one of the terminals includes a re-entrant bend for providing elasticity.

16. An apparatus for joining a plurality of elongated metal terminals to a metal strip by resistance welding,
the metal strip having at least one substantially planar portion, the planar portion having first and second spaced apart major surfaces and at least one side surface connecting the first and second major surfaces at respective edges,
each elongated metal terminal having first and second opposing ends, the first end of each terminal to be resistance welded to the side surface of the planar portion of the metal strip,
the manufacturing system comprising:
an electrode adapted to couple to a portion of at least one of the metal terminals proximate to the first end thereof; and
a power source adapted to couple in series with the electrode and the metal strip such that a current is provided through the terminal and the metal strip for resistance welding the first end of the terminal to the side surface of the metal strip.

17. The apparatus for joining a plurality of elongated metal terminals to a metal strip of claim 16, wherein the electrode includes two movable segments, each having respective gripping surfaces for gripping the terminals therebetween, the gripping surfaces of the segments including grooves for receiving the terminal.

18. The apparatus for joining a plurality of elongated metal terminals to a metal strip of claim 17, wherein at least one of the terminals includes a re-entrant bend to provide elasticity thereto, and the grooves are shaped to substantially match re-entrant bend of the terminal.

19. The apparatus for joining a plurality of elongated metal terminals to a metal strip of claim 16, wherein the electrode includes first and second segments,
the first segment having:
a through hole extending along a first axis for slidably receiving the terminal therein such that the first end of the terminal extends out of t he first segment; and
an opening extending along a second axis intersecting the first axis, the opening permitting communication with the through hole,
the second segment including one end having a gripping surface, the one end being receivable within the opening to engage the terminal.

20. A method of joining a plurality of elongated metal terminals to a metal strip,
the metal strip having at least one substantially planar portion, the planar portion having first and second spaced apart major surfaces and at least one side surface connecting the first and second major surfaces at respective edges,
each elongated metal terminal having first and second opposing ends,
the method comprising the steps of:
holding the first end of the terminal against the side surface of the planar portion of the metal strip; and
resistance welding the first end of each terminal to the side surface of the planar portion of the metal strip.

21. The method of joining a plurality of elongated metal terminals to a metal strip of claim 20, wherein the step of resistance welding the first end of each terminal to the side surface of the planar portion of the metal strip includes the steps of:
connecting an electrode to a portion of at least one of the metal terminals proximate to the first end thereof; and
connecting a power source in series with the electrode and the metal strip and providing a current through the terminal and the metal strip for resistance welding the first end of the terminal to the side surface of the metal strip.

22. The method of joining a plurality of elongated metal terminals to a metal strip of claim 21, wherein the electrode includes two movable segments, each having respective gripping surfaces for gripping the terminals therebetween, the gripping surfaces of the segments including grooves for receiving the terminal.

23. The method of joining a plurality of elongated metal terminals to a metal strip of claim 22, wherein at least one of the terminals includes a re-entrant bend to provide elasticity thereto, and the grooves are shaped to substantially match re-entrant bend of the terminal.

24. The method of joining a plurality of elongated metal terminals to a metal strip of claim 21, wherein the electrode includes first and second segments,
the first segment having:
a through hole extending along a first axis for slidably receiving the terminal therein such that the first end of the terminal extends out of the first segment; and
an opening extending along a second axis intersecting the first axis, the opening permitting communication with the through hole,
the second segment including one end having a gripping surface, the one end being receivable within the opening to engage the terminal.

25. A terminal frame for electronic devices, the terminal frame comprising:
- a metal strip having at least one substantially planar portion, the planar portion having first and second spaced apart surfaces and at least one side surface connecting the first and second surfaces at respective edges, the side surface defining at least one first distance between the first and second surfaces; and
- a plurality of elongated metal terminals, each having first and second opposing ends, the first end of each terminal having at least one second distance spanning the first end, the first end being resistance welded to the side surface of the planar portion of the metal strip, the second distance of the metal terminals being greater than the first distance of the metal strip.

26. The terminal frame of claim 25, wherein at least one of the terminals is cylindrical.

27. The terminal frame of claim 25, wherein at least one of the terminals is prismatic.

28. The terminal frame of claim 25, wherein the first and second surfaces are substantially parallel.

29. The terminal frame of claim 25, wherein at least one of the terminals includes a re-entrant bend for providing elasticity to the at least one terminal.

* * * * *